United States Patent
Thompson et al.

(10) Patent No.: US 10,581,692 B2
(45) Date of Patent: Mar. 3, 2020

(54) SPACECRAFT NETWORK MANAGEMENT SYSTEM AND METHOD

(71) Applicant: The Boeing Company, Chicago, IL (US)

(72) Inventors: Brian C. Thompson, Lone Tree, CO (US); Andrew P. Riha, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 1171 days.

(21) Appl. No.: 14/886,522

(22) Filed: Oct. 19, 2015

(65) Prior Publication Data

US 2017/0111229 A1    Apr. 20, 2017

(51) Int. Cl.
*H04L 12/24*    (2006.01)
*H04L 12/26*    (2006.01)

(52) U.S. Cl.
CPC ............ *H04L 41/12* (2013.01); *H04L 41/042* (2013.01); *H04L 41/0668* (2013.01); *H04L 43/0823* (2013.01)

(58) Field of Classification Search
CPC ........................ H04L 41/042; H04L 41/0668; H04L 43/0823
USPC ....... 709/221, 223, 224, 225, 238; 455/12.1, 455/67.7, 67.11
See application file for complete search history.

(56) References Cited

U.S. PATENT DOCUMENTS

| | | | | |
|---|---|---|---|---|
| 6,058,307 A | * | 5/2000 | Garner | H04B 7/18539 455/428 |
| 6,112,085 A | * | 8/2000 | Garner | H04B 7/18539 455/428 |
| 6,690,934 B1 | * | 2/2004 | Conrad, Jr. | H04B 7/18519 342/357.31 |
| 7,212,837 B1 | * | 5/2007 | Calhoun | H04W 88/08 455/560 |

(Continued)

FOREIGN PATENT DOCUMENTS

| | | |
|---|---|---|
| EP | 1168720 A1 | 1/2002 |
| EP | 2620901 A1 | 7/2013 |

OTHER PUBLICATIONS

"Spacecraft Computer Systems"—Colonel John E. Keese, Massachusetts Institute of Technology, Mar. 2014 https://ocw.mit.edu/courses/aeronautics-and-astronautics/16-851-satellite-engineering-fall-2003/lecture-notes/l19scraftcompsys.pdf (Year: 2014).*

(Continued)

*Primary Examiner* — Randy A Scott
(74) *Attorney, Agent, or Firm* — Coats & Bennett, PLLC

(57) ABSTRACT

A spacecraft network management system includes five functional entities, namely, attendant, accessor, collector, logic, and logic watchdog in a distributed architecture configured with both in-band and out-of-band data paths. Management data is structured so that it can travel over either in-band or out-of-band and be identified as such; user data travels over in-band paths. These five entities are distributed over the units of the design and then a modified set of otherwise standard elements are assigned to each entity (Continued)

depending on the nature of its function. These elements include managers, management agents, device agents, device management information base, and manager management information base that enable the entities to perform their respective functions.

20 Claims, 4 Drawing Sheets

(56) References Cited

U.S. PATENT DOCUMENTS

| | | | |
|---|---|---|---|
| 8,989,194 B1 | 3/2015 | Poutievski et al. | |
| 2009/0190491 A1* | 7/2009 | Miller | H04B 7/18513 370/252 |
| 2014/0208133 A1* | 7/2014 | Gopal | G06F 11/2294 713/310 |
| 2016/0011318 A1* | 1/2016 | Cohen | G01S 19/05 342/357.26 |

OTHER PUBLICATIONS

Combined Search and Examination Report for Application No. GB 1617428.6, dated Mar. 26, 2017.
Autonomic Computing, (describes the IBM initiative for autonomic networks); from https://en.wikipedia.org/wiki/Autonomic computing; published Oct. 6, 2015. Oct. 6, 2015.
ITU-T Telecommunications Standardization Sector of ITU (M.3010), Series M: TMN and Network Maintenance: International Transmissions Systems, Telephone Circuits, Telegraphy Facsimile and Leased Circuits, p. 1-44; Feb. 1, 2000 Feb. 1, 2000.
Webpage Network Management System: Best Practices White Paper-Cisco; from www.cisco.com/c/en/us/support/docs/availability/high-availability/15114-NMS-best . . .; pp. 1-20; Jul. 11, 2007 Jul. 11, 2007.

* cited by examiner

SPACECRAFT NETWORK MANAGEMENT SYSTEM AND METHOD

TECHNOLOGICAL FIELD

The present disclosure relates generally to the field of computer networks. More specifically, the present disclosure relates to networks for managing the operation of computer networks on a spacecraft.

BACKGROUND

Computer network management is an extensively studied field. Many architectures, management schemes, communication protocols, and hardware platforms are readily available, but those are largely based on the assumption that the network is terrestrial. Not all networks are and the situs of the network can be very important. While there are many similarities between terrestrial and space-based networks, there are unique features that limit the applicability of a terrestrial network management system (NMS) to a space-based NMS. Specifically, a space-based NMS, being isolated, must maintain a high level of reliability and availability notwithstanding the increased environmental impacts encountered in space. In addition, the space-based NMS must recover quickly and autonomously. Therefore, robustness, redundancy and autonomy are central to the implementation of an effective space-based NMS.

Redundancy is a straightforward matter in design implementation to meet spacecraft reliability requirements. The redundancy may be a 2:1, 3:2, or other ratio, wherein the first number indicates the total number of components or systems and the second is the number required to be active at any one time for normal operation. A much more subtle issue is the state of each back-up component or system, which can run from active-monitoring, to hot-standby, and to cold-standby.

Security is of course another consideration, and an important one for terrestrial networks—a terrestrial NMS could potentially be comprised through the Internet. Security is also an important consideration for space-based networks, but less so, especially for an intra-spacecraft network where access is extremely limited and the space-ground connection is secure. Therefore, security internal to the intra-spacecraft network is not a necessary requirement of every space-based NMS.

In most cases, space-based networks are not accessible by humans. While this limitation increases the need for redundancy, it also adds complexities that are not seen in terrestrial networks but that must be overcome. For example, the space-based NMS must autonomously recover from an unforeseen software failure since a human may not be available to press a reset button, for example.

Component choice is clearly important in any network design but especially so in space-based networks. When compared to a terrestrial network, network components on a spacecraft are constructed with proven technologies, which tend to be older, larger, heavier, and to have power limitations that newer technology has improved. Newer components that would appropriately support a terrestrial NMS are not appropriate for a space-based NMS simply because they have not demonstrated they meet the reliability requirements dictated by the increased environmental impacts that affect space-based NMS.

Network Management systems may have a centralized or a distributed architecture. In a management architecture that is centralized, all of the management tasks are located in one area, but in a distributed architecture, management tasks are spread throughout the network. The lack of human intervention and the need for quick recovery are driving factors for a spacecraft network management system (SNMS) to have a distributed network architecture. In addition, because a network within a satellite is not capable of being repaired by a human like a terrestrial network, the SNMS is also improved if redundant systems are located in different units, boards, or sections of a board. Finally, in the event of a failure of the SNMS, the redundant portion of the SNMS must become active immediately to meet space-based performance requirements and to support spacecraft safety functions.

A network management system that is reliable, has high availability, is robust to the space environment, and is able to function autonomously would be advantageous as a spacecraft network management system.

BRIEF SUMMARY

The spacecraft network management system, as disclosed herein, includes entities, common elements, components, and data paths connecting the entities, common elements and components. The data paths pass user data and network management data. Data paths include both in-band paths and out-of-band paths. User data is transmitted only over in-band paths. Network management data, however, is transmitted over both out-of-band paths and in-band paths, and, when transmitted over in-band paths is distinguishable from user data because it is framed differently than user data, typically by being encapsulated in packets or including escape sequences. By enabling a dual path for network management (NM) and user data, design and component costs are lower because of the fewer physical interfaces needed, which thereby reduces system complexity while improving system autonomy and robustness.

The entities collect network management data by polling for it when it is needed and push it whenever network management data has changed. There are five different entities including an attendant entity, an accessor entity, a collector entity, a logic entity, and a watchdog entity. Each entity has a different function but together they represent all the major functions of any spacecraft network management system.

All devices connected to the network have attendant entities. An attendant entity has an in-band portion and an out-of-band portion. The in-band portion includes all the components internal to the network management system. The out-of-band portion contains the control and status components that are accessed outside the network. The attendant entity accesses and derives status information from all components via both in-band network data and external telemetry signals via out-of-band paths.

The accessor entity also has an in-band portion and an out-of-band portion and is interconnected with the attendant entity, the collector entity, the logic entity, and the logic watchdog entity via both in-band and out-of-band paths. The accessor entity requests network management data from the attendant entity, makes changes in the configuration of the network management system, and executes tasks for the logic watchdog entity.

The collector entity is connected to the logic entity and the logic watchdog entity. It gathers and organizes network management data received from the accessor entity.

The logic entity gathers network management data from the collector entity to use in making network management decisions. The logic entity also reconfigures the network management system following a failure using the redundant paths to marginalize the effects of failure. Failure not only includes permanent failure but also repeated temporary failure.

The logic watchdog entity monitors the logic entity for failures, for correct operation, and for its ability to communicate with the accessor and collector entities.

The network management system may have a "manager-of-managers" (MoM) system when operating as a tiered system with one manager managing other tiers. The MoM would have a logic entity and a logic watchdog entity.

The network management system may be implemented using application-specific integrated circuits or field programmable gate arrays or any combination thereof.

The network management system includes common elements, namely device agents, management agents, device information bases, management information bases, and managers. These common elements communicate through a network management entity interface (NMEI).

The present disclosure also describes a method of setting up a network management system. The method requires defining an attendant entity, an accessor entity, a collector entity, a logic entity, and a watchdog entity; defining common elements; defining components; and defining data paths connecting the entities, common elements and components. The method requires establishing transmission paths including the in-band data paths that transmit user data and network management data and the out-of-band paths that transmit only network management data.

The method also requires distributing the network management common elements among the entities, connecting them, and structuring management data, perhaps by encapsulation or use of escape sequences, so that the management data can be distinguished from user data when traveling over the in-band paths. The method requires implementing the entities so that they are connected to the elements via at least one redundant path.

The method further includes the step of assuring redundant paths that enable the logic entity to marginalize the effects of the failure.

DETAILED DESCRIPTION

Figure 1:
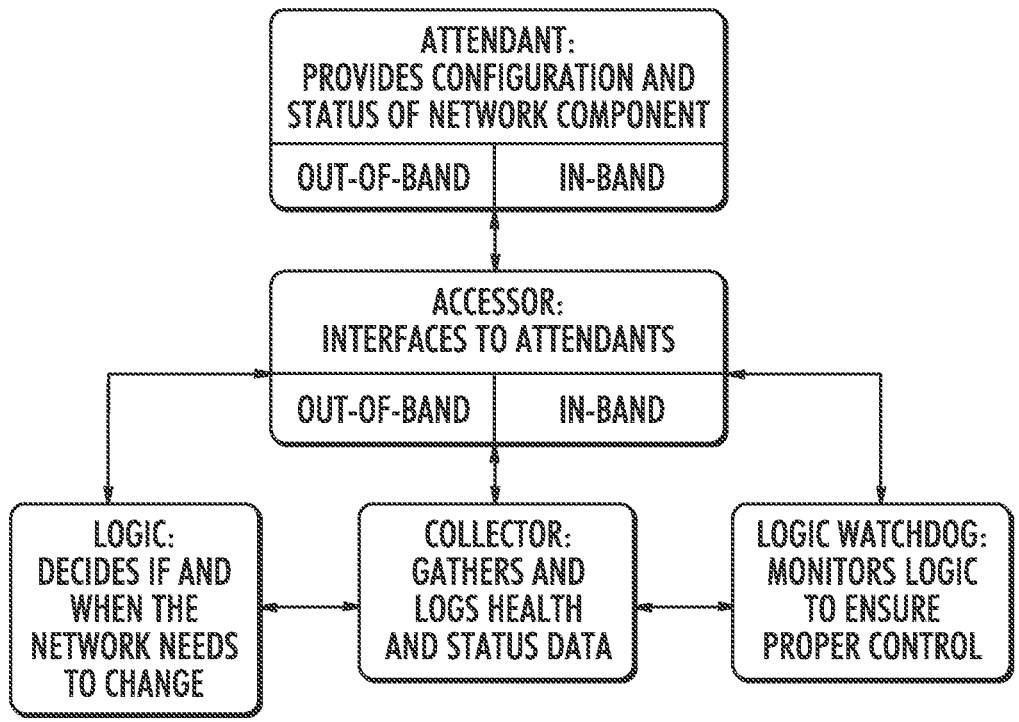
FIG. 1 is a schematic diagram of SNMS entities and their relationships, according to an aspect of the disclosure.

The spacecraft network management system (SNMS) as disclosed herein may be characterized by a distributed architecture organized in tiers. A multi-tiered SNMS has several tiers, or levels, of primary management entities. Each level has the capabilities and responsibilities required for that level plus a watchdog function presiding over all of the primary management entities. The tiered, distributed SNMS may comprise a Manager-of-Managers (MoM) system of several levels but at least includes a logic entity and a watchdog entity in each level. The entities contain common elements that manage communications with the software components. Common elements fall within each entity and are connected with elements in other entities via a dual-band communication approach. This communications approach provides a backup path communication path for transmitting management data. In addition, redundant components, with the same management architecture as their primary counterparts, are also interconnected to the common elements of the primary spacecraft management system, awaiting activation in the event of failure of the primary components. While the present SNMS is designed for redundancy, no particular standby state of the redundant items is required and it may be any of the following: "active-monitoring," "hot-standby," or "cold-standby" depending on the choice of the designer of the components of the specific computer system to be managed.

The functions of each entity and the types of common elements will be described below, and an example of the use of the present system will be provided.

Acronyms are used throughout this specification for convenience. These include ASIC which stands for Application-Specific Integrated Circuit; COTS, for Commercial off-the-shelf; DA, for a Device Agent element; DMIB, for Device Management Information Base element; FPGA, for field-programmable gate array; IB, for In-band; ISO, for International Organization for Standardization; ITU-T, for International Telecommunication Union Telecommunication Standardization Sector; MA, for Management Agent element; MAN, Manager element; MIB, for Management information base element; MMIB, for Management MIB element; MoM, for Manager-of-Managers element; NM, for Network Management; NMEI, for Network Management Entity Interface element; OB, for Out-of-band; T&C, for telemetry and command; SNMS, for Spacecraft Network Management System; and SEU, for Single Event Upset.

In addition to the reasons stated above for selecting a distributed architecture over a centralized architectural system for this SNMS, a distributed system is selected when subcontractor-designed and commercial-off-the-shelf (COTS) subsystems or payloads have built-in redundancy and failure mechanisms. Accordingly, an SNMS according to this disclosure may take advantage of pre-existing redundancy and failure mechanisms in any of the subsystems in a distributed network management system through use of a distributed design.

Information is transmitted as data over two paths and there are two kinds of data, user data and NM data. NM data includes any data that (1) performs a network management task and (2) is structured to have a specific message format. User data, on the other hand, is defined as any data, including NM data. NM data is therefore a subset of user data. If information is used for spacecraft network management (and is structured with a specific message format), it is categorized as NM data, but if it is used for any other type of purpose, whether structured or not, it is user data.

User data is typically transmitted over "in-band" paths. SNMS transmits NM data, on the other hand, via a hybrid in-band (IB)/out-of-band (OB) transmission path. NM data can be transmitted between network entities in one of two ways: (1) on the same path as user data (in-band) or (2) on a different path than user data, namely, out-of-band. Structuring NM data enables it to be distinguished from user data when it travels over in-band paths.

NM data may be structured by encapsulating it in packets, escape sequences, or otherwise framing it differently than user data in order to differentiate it from user data. Structuring NM data enables it to travel the in-band path when necessary or desirable yet still be identified for what it is. By enabling a dual path for NM data, design and component costs are lower because of the fewer physical interfaces required, which thereby reduces system complexity while improving system autonomy and robustness.

For example, the primary management entity of the SNMS, namely, the attendant entity, accesses all network components from which it derives NM data via external telemetry signals, such as the on/off status of telecom and control units and interfaces. External telemetry is an out-of-band transmission mode for NM data. (It is important to note that the network is not normally managed through out-of-band paths; normally, the network is managed over in-band paths using information obtained via out-of-band transmissions.) Because of the availability of the parallel transmission mode, the SNMS is more robust and fault tolerant inasmuch as NM data may also be made available over either transmission path. If the primary path fails, SNMS may transmit NM data for management via the redundant path.

Entities

An important feature of the disclosure is that the SNMS is based on a functional classification system. Viewing the network management system for a spacecraft as a set of functions and then designing the system accordingly yields the benefits of robustness, redundancy, and autonomy needed in a space environment. Entities comprise the core functions that exist in a SNMS. Each functional class, or entity, is given a name and characterized for what functions it has. This approach allows for the efficient design of many different space-based networks with varying technologies, protocols, sizes, and topologies in a manner that reduces complexity. Additionally, the inter-connections needed to access, maintain, and control the entities are reduced into smaller blocks called "common elements."

Five entities are defined within the SNMS: attendant, accessor, collector, logic, and logic watchdog. These entities apply to any spacecraft network management system and are not limited to a specific physical construction. Indeed, they may be implemented in numerous ways. These five entities, while general enough to be applied across any spacecraft component configuration, nevertheless still provide the ability to implement an SNMS in many different ways. For example, the collector and logic entities may be implemented together on the same application-specific integrated circuit (ASIC), and there may be numerous instantiations of this ASIC across one spacecraft. The instantiations may be in the form of a field programmable gate array (FPGA) or be implemented using other assemblies of logical hardware components.

Entities provide "health and status" information in either a push ("heartbeat") or pull ("polling") system. Health and status information is information about the performance of systems and components: Are they functioning at all, how well are they functioning, and are they under stress such as heat loads that affect performance and reliability? The implementation of any entity is program-specific, and is not the subject of this disclosure as long as the data is provided by the entity and in a timely manner so as to facilitate the intended operation of the SNMS. Entities may push data whenever the data has changed and entities may poll for data, as needed.

The functions of the individual entities of the present SNMS are defined below and their relationships with other entities are illustrated in a block diagram shown in FIG. 1.

Note that FIG. 1 is a functional representation of the entities and their relationships to each other and does not show the actual topology, entity implementation, redundancy, or other details of a management network.

The attendant entity is the entity that typically houses the majority of the network components. Every component connected to the network has an attendant entity. The attendant entity is divided into two portions: IB and OB. The IB portion includes all the network components that are maintained in the SNMS. These components are accessed via in-band paths. A component may include any hardware device, from a physical controller to a higher-level protocol configuration. The OB portion includes components such as the controls and status points that are accessed outside of the network, via out-of-band paths. Reset, on/off status, and controls are examples of OB components.

The accessor entity is the interface between the attendant entity and the logic, collector, and logic watchdog entities. The accessor entity requests data from the attendant entity and makes configuration changes in the SNMS. Like the attendant entity, it also has IB and OB portions.

The collector entity is responsible for gathering and organizing the network information needed for the logic and logic watchdog entities. The collector entity requests data from the accessor entity.

The logic entity represents the central management authority within the SNMS. There may be one logic entity in the SNMS and it may be charged with performing all management functions taking place or there may be several logic entities, each in a separate tier in the spacecraft, which are each tasked to manage specific function. The logic entity receives all the information needed from the collector entity for it to make management decisions. Additionally, if the logic entity requires the network to be reconfigured, it interfaces directly with the accessor entity in order to put that configuration into effect.

The logic watchdog entity (or simply watchdog) is an important aspect of the present disclosure. The watchdog entity activates redundant systems and components. In particular, the present watchdog function (1) monitors the primary entities of SNMS, (2) switches network control to a redundant portion of the SNMS, and (3) is not susceptible to the same conditions that caused the failure in the other portion of the SNMS. The watchdog entity monitors the logic entity for correct operation. During nominal operation, the watchdog verifies that the logic entity has not failed and that the logic entity is able to communicate with the accessor and collector. If the watchdog determines the logic entity cannot fully perform its tasks, the watchdog will switch the logic entity to a redundant logic entity. The watchdog entity cannot itself be the redundant logic entity. The watchdog also communicates with another accessor entity for execution of its tasks. In order to facilitate the unique characteristics of the present SNMS, this accessor should not be the same accessor that the logic entity uses, and ideally this accessor should be locally available to the watchdog. Locally available in this context means on the same component. This is another feature of the present disclosure The watchdog function may be required in a range of locations, such as in a redundant unit or even in a separate system, but any implementation of the watchdog entity mandates a distributed architecture for the SNMS in which there is a manager that performs a watchdog function on the manager(s) performing the network management functions, a Manager-of-Managers (MoM) architecture.

Common Elements

SNMS uses the basic elements established by the International Organization for Standardization (ISO) Network Management model for the space-based common elements. These elements are (1) manager, (2) agent, and (3) management information base (MIB). The terms manager, agent, and management information base connote a management structure but that connotation is in fact ambiguous in the present context. Accordingly, these terms are described herein to remove that ambiguity.

As used herein, a MIB is a collection of information, typically, parameters, about physical devices and software components. A manager makes data requests of agents and responds to requests or data set instructions of other agents or of network management interfaces. Agents perform a request or send information to MIBs.

These basic elements are now further defined into two classes: device and management. The device class interacts with sources of information or control points, such as registers. The management class is a representation of the network information.

Accordingly, there are five common elements used in the present SNMS: Device Agents (DAs), Management Agents (MAs), Device MIBs (DMIBs), and Management MIBs (MMIBs), and Managers (MANs). Finally, another common element, namely, a Network Management Entity Interface (NMEI), is established to identify all the common elements needed to build a communication model.

A DMIB is a conceptual collection of information or parameters on various physical devices and software components. It is called a conceptual collection in that the parameters may not be an organized and assembled collection of parameters, but rather the parameters may be accessed through different methods. As an example, a DMIB for a device may be the parameters in the registers of an ASIC, the physical switches of a device, and the bits in a RAM. If there is a change in the register, the DMIB—the conceptual collection of information or parameters—is said to have changed. For an agent to make a change to a DMIB, it does so by making the change to the physical register. The common elements as defined herein are features of the present disclosure.

A DA interacts with a DMIB, but not an MMIB and may have the capability to request a DMIB parameter, to set a DMIB parameter, or both. The primary feature of a DA is that it has the ability to correctly interface with a DMIB and respond to a MAN. The DA performs its functions by responding to a MAN's instructions. Given the different locations possible for the conceptual collection of information and parameters of the DMIB and their methods of interfacing with a DMIB, more than one DA may be needed to capture all the DMIB information.

For example, when a MAN makes a data request for a particular parameter, the DA accesses the DMIB through the correct protocol and reports the information back to the MAN.

An MMIB is different from a DMIB in that an MMIB is an actual, rather than conceptual, collection of information that is stored in one location. Also, an MMIB is a representation of the network parameters. A change in an MMIB does not directly change a DMIB and a change in a DMIB doesn't directly change an MMIB. An MMIB may contain information from one or more DMIBs or other MMIBs. An MMIB can contain, but does not require, all of the parameters from another MMIB or DMIB.

An MA is similar to a DA except that it interacts with MMIBs instead of DMIBs. An MA may have the capability to request or set an MMIB parameter. The primary feature of an MA is that it has the ability to correctly interface with an MMIB and to respond to a MAN. An MA performs its functions in response to a MAN's instructions. For example, when a MAN makes a data request for a particular parameter, the MA accesses the MMIB through the correct protocol and reports the information back the MAN.

A MAN has two functions. First, it gives instructions to agents, either DAs or MAs. Second, it provides translation functions from one MA to another MA, from an MA to a DA, and from either an MA or a DA to an NMEI.

An NMEI is a general component used to describe the interactions required for a process to access the other common elements. It is the component that initiates all requests of MANs and, in turn, receives the responses of MAs and DAs. For example, an NMEI could be used for getting the information needed for the failure detection logic to operate or it may be used to change the operational state of a device via a MAN, DA, or DMIB.

Failure Response

Figure 2:
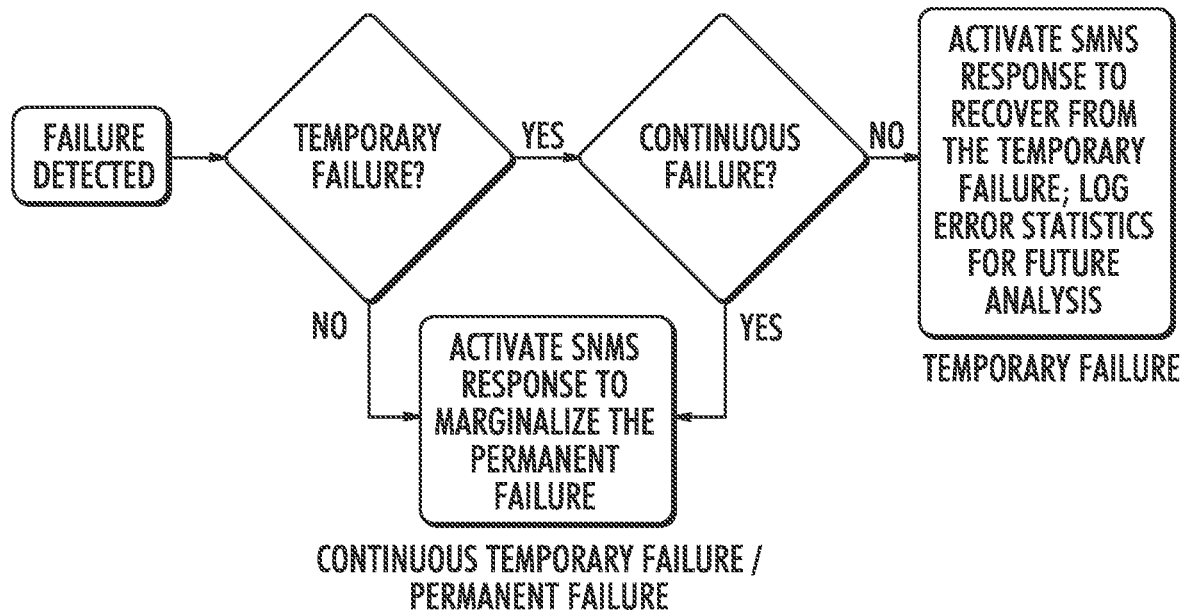
FIG. 2 is a flow diagram showing response to detected failures, according to an aspect of the disclosure.

Referring now to FIG. 2, there is shown a flow diagram for determining the failure response according to the present disclosure. When a failure is detected within the SNMS, it is classified as either a temporary failure, a continuous temporary failure, or a permanent failure. The first time a failure is detected, it is either temporary or permanent.

A temporary failure is a transient failure; that is, once it is detected, the temporary failure can be corrected or returned to a nominal condition with little or no intervention. For example, if a single event upset (SEU) corrupts a packet and the underlying network protocol detects and corrects the error, then the failure is designated as a temporary failure. However, when a temporary failure occurs, error statistics are logged for future analysis in order to determine whether such repeated temporary failures constitute a continuous set of temporary failures.

A continuous temporary failure is a particular, repeated, temporary failure that has been determined from statistical analysis of data accumulated on the set of temporary failures. For example, if a link encounters a source of noise that repeatedly corrupts data packets, data logged about the impact of the poor link quality and the resulting repeated failures of data packets will eventually result in this repeated failure being classified statistically as a continuous temporary failure. The threshold to transition from a temporary failure to a continuous temporary failure is determined statistically by system designers. Once that transition occurs, the SNMS responds in the same manner to the continuous temporary failure as it does to a permanent failure.

A permanent failure is a non-transient failure. Once detected, the SNMS responds to a permanent failure by reconfiguring the network in order to marginalize the effects of the failure. For example, if a network interface became physically disconnected, the SNMS would respond by reconfiguring the network, utilizing redundant paths and components in order to restore connection to the network interface.

The ITU-T Telecommunications Management Network (M.3010) document categorizes the network management tasks into five functional areas commonly called FCAPS: Fault Management, Configuration Management, Accounting Management, Performance Management, and Security Management.

Fault Management

Fault management is the most critical network management task in SNMS, because fault management is responsible for autonomously detecting and correcting network problems so as to minimize network service outages. Additionally, fault management logs faults it detects and its responses.

The following describes the roles that each entity has for the fault management function.

The attendant entity provides the data necessary to respond to change requests associated with fault management directives. The attendant entity may also be enabled to push error notifications to collectors via the accessor entity.

The accessor entity is accessed by the collector, logic, and watchdog entities, and an accessor entity, but not necessarily the same accessor entity must be accessible for all fault scenarios (and different accessor entities may be used for access in the event of different fault scenarios).

The collector entity pulls all the data necessary for fault management. Also, if the system design permits, the collector entity receives pushed error notifications from the attendant entity via the accessor entity. The collector entity may also push received error notifications to either a logic entity or a watchdog entity.

The logic entity makes all fault management decisions unless the fault occurs within the logic entity itself. The logic entity determines how to reconfigure the network to correct or route traffic around a fault via accessor entities. Also, the logic entity must have its own fault logic state held in a collector entity that is accessible to a redundant logic entity either directly or through a watchdog entity.

The watchdog entity is required to make fault management decisions when the fault is within the logic entity—all other fault management decisions are to be made by a logic entity. The watchdog entity makes network changes to correct or re-route traffic around a fault via accessor entities. Also, the watchdog entity must maintain its fault logic state in a collector that is accessible to a redundant watchdog entity.

To provide support for testing purposes, users may enable or disable fault detection and corresponding responses in the logic or watchdog entities.

Configuration Management

Configuration management monitors the network for changes and for the state of the entities.

The following describes the roles that each entity has for the configuration management function.

The attendant entity provides the necessary data to determine the spacecraft network configuration. If designed to do so, the attendant entity may also push change notifications to the collector entity.

The accessor entity may be accessed by the collector, logic, and watchdog entities. The accessor entity uses common elements, namely, DA and MA attendant entities to collect configuration information and to make configuration changes via the collector and logic entities.

The collector entity pulls all the configuration data at pre-selected intervals from all entity types. Also, if the system design permits, the collector entity can respond to pull requests from logic or watchdog entities for information as to their current state.

The logic entity provides the logic's network management state and pushes a log of network changes. It also changes the logic's network management state and forwards that change of state to a collector at regular intervals. The logic entity reconfigures the network when network changes are made (i.e. a new phase of the mission begins and additional units are powered on).

The watchdog entity provides the watchdog's network management state and pushes a log of changes made to the watchdog's network management state to a collector entity at regular intervals.

Users may change the network configuration through, and gather network configuration data from, the logic entity.

Accounting Management

Accounting management plays a lesser role in space-based networks than in terrestrial networks. SNMS accounting management provides updates, when the particular entity permits it, and tracks entity changes and current versions of the network.

The following describes the roles that each entity has for the accounting management function.

The attendant, accessor, collector, logic, and watchdog entities may accept updates (RAM patches, software upgrades, policy changes, etc.) and provide configuration version information.

Users may be allowed to make updates (RAM patches, software upgrades, policy changes, etc) to entities.

Performance Management

Performance management collects and monitors performance data. Limits may be set in this task that trigger fault responses when a set threshold is exceeded and thereby indicates a fault in performance.

The following describes the roles that each entity has for the performance management function.

The attendant and accessor entities are required to provide data at rates sufficient for the performance measurements.

The collector entity pulls all the data at pre-selected intervals from all entity types.

The logic entity sets limits for performance value measurements that trigger fault responses when exceeded. If needed, the logic entity pushes a log of performance values measured.

There are no performance management requirements applicable to the watchdog entity.

Users are allowed to access collector entities in order to request performance information for spacecraft needs, such as telemetry for autonomous fault responses.

Security Management

The SNMS does not provide security management tasks, but such tasks can be included if required. Unless otherwise specified in the system design, the SNMS is based on the expectation that user access to the network is controlled. If user access control is needed, other components are used for that purpose.

EXAMPLE

Figure 3:
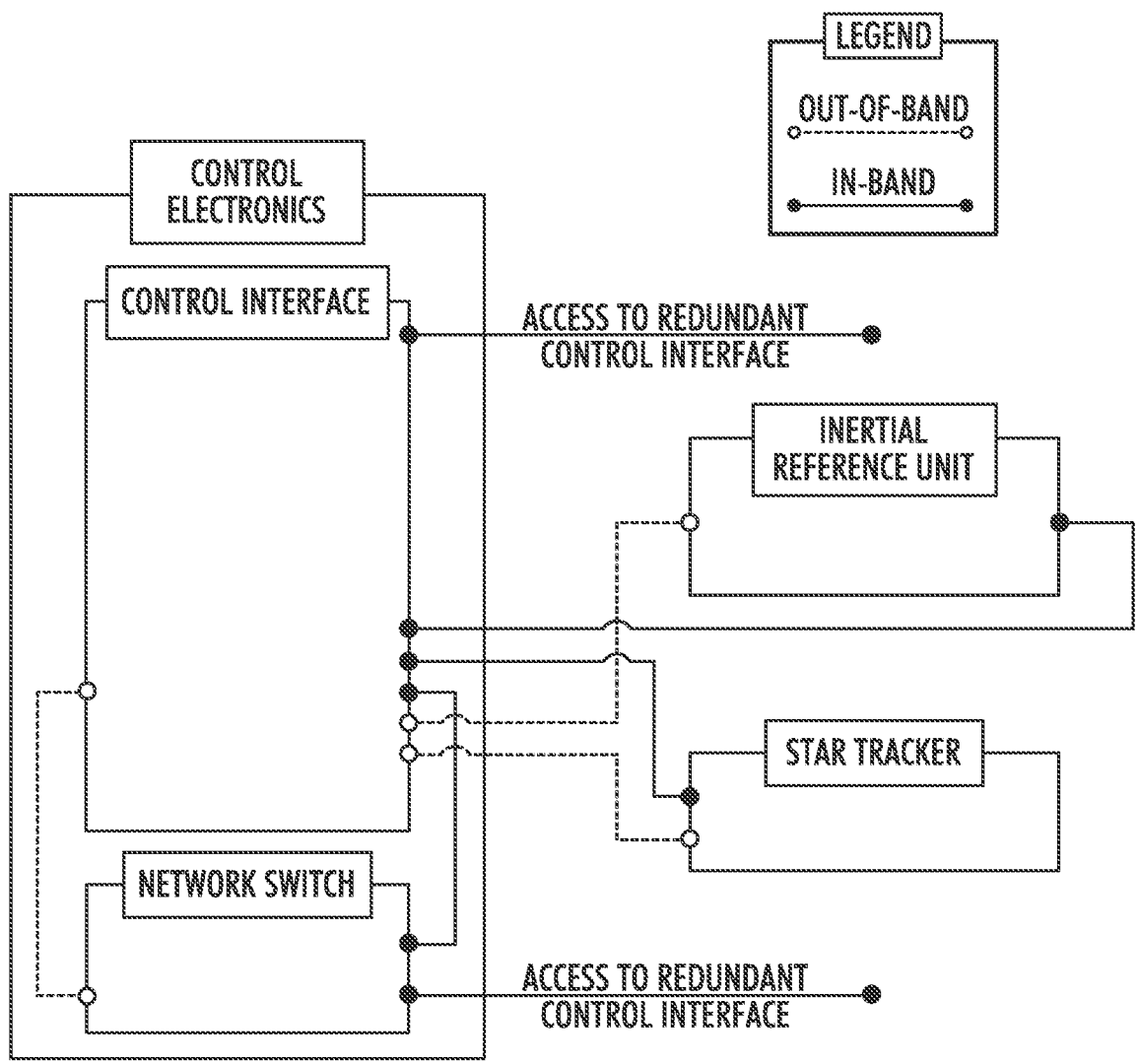
FIG. 3 is a diagram of a unit level network with logical connections, according to an example of the disclosed system and method.
Figure 4:
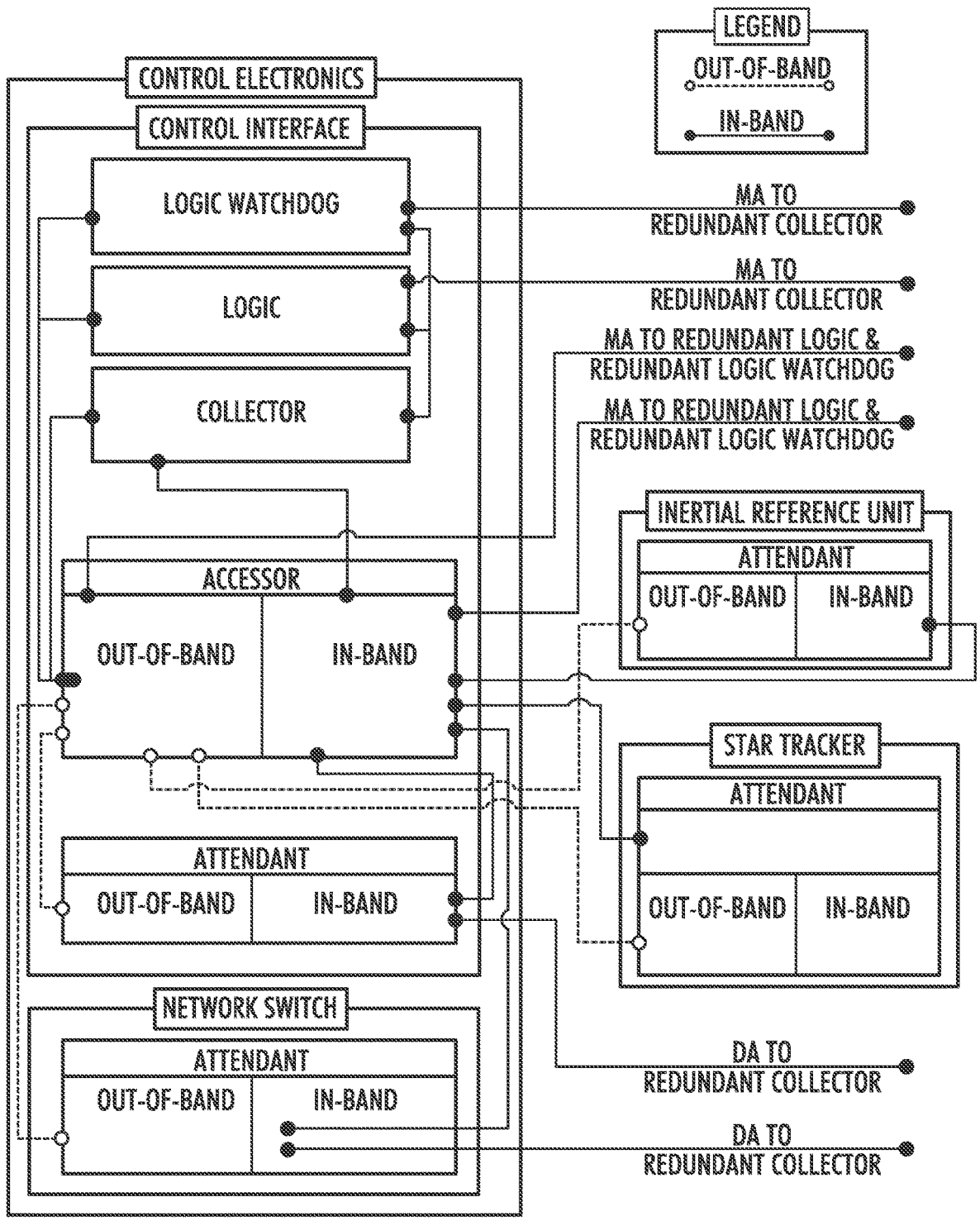
FIG. 4 shows the diagram of FIG. 3 with entities assigned to particular units, according to an example of the disclosed system and method.
Figure 5:
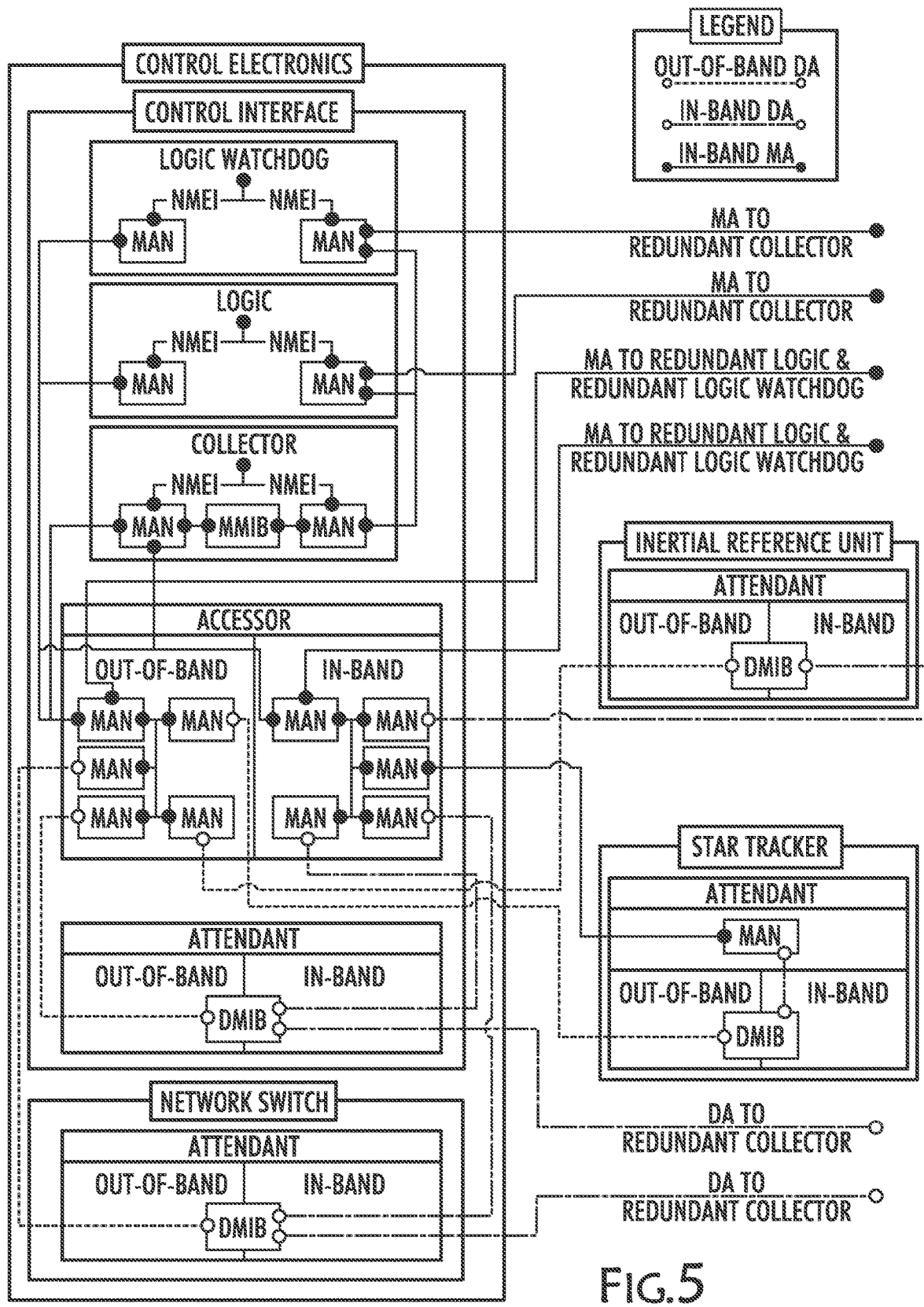
FIG. 5 shows the diagram of FIG. 4 with common elements assigned to entities, according to an example of the disclosed system and method.

To assist in the understanding of the concepts presented, a basic network is provided as an example and is illustrated in FIGS. 3, 4 and 5, which show in three steps the development of the SMNS and thereby show how concepts of the SNMS are applied, starting with units, then proceeding to add the entities, and finally to the common elements.

At the unit level, the network in this example is a control electronics unit, which contains a control interface, where the "brains" of the electronics are located, and a network switch. It also includes an inertial reference unit and a star tracker. These four main items are all connected through a common network. Additionally, there are several analog access points that provide status and control data such as on/off command and status lines, as will be explained below. This exemplary SNMS is controlled by the Control Interface which uses data from the other units to monitor and configure the network.

FIG. 3 also shows the logical connections (not the physical connections) between the units. Notice that each unit has an in-band and out-of-band logical connection, which are indicated in accordance with the Legend in FIG. 3.

The next step, shown in FIG. 4, is to assign entities to the units of FIG. 3. The assignment of entities defines the units' functions within the SNMS. This step allocates design requirements and ensures the SNMS is properly designed. In this example, as illustrated in FIG. 4, the control interface is assigned all five entity types: attendant, accessor, logic, collector and logic watchdog. The logic entity in the control interface maintains the network. A logic watchdog entity in the control interface unit assures that the logic entity is active and operating correctly. An accessor entity is also assigned to the control interface and connected to the attendant entities in all four units. Finally, all units have an attendant entity to allow access by the accessor of the control interface unit to the network information within each of the four units. The entity assignments and logical interfaces are shown in the logical connections between entities.

Finally, and as shown in FIG. 5, the common elements are shown assigned to the entities to ensure the SNMS can communicate properly. The connections shown in FIG. 5 are again logical and not physical connections. The logic watchdog entity is allocated two MANs and two NMEIs. Through the NMEIs, the control interface can access information from the collector's MMIB (right side) to make network configuration changes through the logic entity and, from the accessor (left side), to the other units. The logic entity has the same common elements as the logic watchdog, but will likely access different data sets and execute different configuration changes depending on the specifics of the design.

The collector entity provides a MAN for the logic and logic watchdog entities to communicate with the accessor (this example shows these entities using the same MAN, although a different design could use different MANs). The other MAN in the logic and logic watchdog entities is used to collect the data to be stored in its MMIB.

The accessor contains several MANs to provide data translations to access the components in the inertial reference unit and the star tracker unit. The attendant entity within the Control Interface is simple and contains a DMIB for an interface between the MANs in the accessor that pull the information directly from the units. In this example the network switch and inertial reference unit's attendant entities are allocated a DMIB similar to the control interface's attendant entity. The star tracker has an in-band interface to access the network information, but unlike the inertial reference unit, this interface provides a communication translation to access the DMIB. In this example, star tracker is postulated as being custom-built and, at the time the network owners gave interface requirements to the manufacturer of the star tracker, the manufacturer was baselining an existing star tracker design. So rather than rework all of the DMIB components, the star tracker manufacturer added a MAN to act as a translator.

Now that the units have been assigned entities and common elements, the network design team can allocate functional requirements to each unit, identify and describe the communication interfaces, and determine the data and controls needed to develop the network management logic of the SNMS.

When introducing elements of the present disclosure or exemplary aspects or embodiment(s) thereof, the articles "a," "an," "the" and "said" are intended to mean that there are one or more of the elements. The terms "comprising," "including" and "having" are intended to be inclusive and mean that there may be additional elements other than the listed elements. Although this disclosure has been described with respect to specific embodiments, the details of these embodiments are not to be construed as limitations.

What is claimed is:

1. A distributed network management system on a spacecraft, the system comprising:
   one or more component circuits, each component circuit implemented as hardware and configured to perform a respective function associated with the spacecraft;
   a control circuit implemented as hardware and communicatively connected to each of the one or more component circuits via in-band (IB) communication paths and out-of-band (OB) communication paths, and configured to manage the one or more components; and
   wherein each of the control circuit and the one or more component circuits is configured to execute a respective attendant function, with each attendant function configuring its respective circuit to:
      communicate network management data via the IB and the OB communication paths, wherein the network management data comprises information used for network management tasks on the spacecraft; and
      communicate user data via the IB communication paths only, wherein the user data is a superset of the network management data and comprises information that is used for purposes other than the network management tasks on the spacecraft; and
   wherein the control circuit is further configured to execute an accessor function communicatively connecting the attendant function to a collector function, a logic function, and a watchdog function via the IB and OB communication paths.

2. The distributed network management system of claim 1 wherein each attendant function further configures its respective circuit to access components external to the distributed network management system.

3. The distributed network management system of claim 1 wherein each attendant function further configures its respective circuit to:
   categorize information as being network management data;
   encapsulate the network management data in one of packets and escape sequences.

4. The distributed network management system of claim 1 wherein the control circuit and the one or more component circuits are implemented as application-specific integrated circuits, as field programmable gate arrays, or as any combination thereof.

5. The distributed network management system of claim 1 wherein the system comprises a tiered network management system having multiple levels, and wherein the control circuit and at least one of the one or more component circuits are further configured to execute respective accessor functions.

6. The distributed network management system of claim 5 further comprising a manager-of-managers (MoM) system in addition to the logic function and the watchdog function.

7. The distributed network management system of claim 1 wherein each attendant function further configures its respective circuit to assess and derive status information from the accessor function, the collector function, the logic function, and the watchdog function via external telemetry signals communicated via the OB communication paths.

8. The distributed network management system of claim 7 wherein the accessor function configures the control circuit to:

request the network management data;
modify a configuration of the network management system; and
execute the network management tasks of the watchdog function.

9. The distributed network management system of claim 7 wherein the control circuit is further configured to:
execute the collector function to collect and organize the network management data;
execute the logic function to make network management decisions based on the network management data; and
execute the watchdog function to monitor the logic function for failures, and to communicate the network management data with the accessor function and the collector function via the IB and OB communication paths.

10. The distributed network management system of claim 9 wherein the failures comprise a continuous temporary failure, and wherein the logic function reconfigures the distributed network management system using redundant communication paths to marginalize an effect of the continuous temporary failure.

11. The distributed network management system of claim 1 further comprising a redundant accessor function executing on another circuit, and wherein the logic function configures the redundant accessor function to reconfigure the network management system.

12. The distributed network management system of claim 11 wherein the redundant accessor function is implemented to be locally available to the watchdog function.

13. The distributed network management system of claim 1 further comprising circuitry configured to execute one or more of a device agent, a management agent, a device information base, a management information base, and a manager, and wherein the one or more of the device agent, the management agent, the device information base, the management information base, and the manager communicates via a network management entity interface.

14. The distributed network management system of claim 1 wherein the control circuit further comprises a network switch configured to execute a corresponding attendant function, and wherein the attendant function executing at the network switch is communicatively connected to the attendant function executing on the control circuit via the IB and OB communication paths.

15. A method of managing a distributed network management system on a spacecraft, wherein the distributed network management system comprises one or more component circuits, each implemented as hardware and configured to perform a respective function associated with the spacecraft, and a control circuit implemented as hardware and communicatively connected to each of the one or more component circuits via in-band (IB) communication paths and out-of-band (OB) communication paths, the method comprising:
structuring network management data to be communicated over the distributed network management system so as to distinguish the network management data from user data being communicated over the IB communication path;
communicating the network management data via the IB and the OB communication paths, wherein the network management data comprises information used for network management tasks on the spacecraft; and
communicating the user data via the IB communication paths only, wherein the user data is a superset of the network management data and is used for purposes other than the network management tasks on the spacecraft;
executing, at the control circuit, an accessor function, wherein the accessor function is communicatively connected to each of the attendant functions executing at each of the control circuit and the one or more component circuits;
obtaining, by the accessor function, status information from one or more of the attendant functions executing at the one or more component circuits, a collector function, a logic function, and a watchdog function executing at the control circuit; and
receiving, at the attendant function executing at the control circuit, the status information from the accessor function via external telemetry signals communicated via the OB communication paths.

16. The method of claim 15 further comprising categorizing information to be communicated via the network as being one of the network management data and the user data.

17. The method of claim 15 wherein structuring the network management data comprises encapsulating the network management data in one of packets and escape sequences so as to distinguish the network management data being communicated via the IB communication paths from the user data being communicated over the OB communication paths.

18. A method of managing a distributed network management system on a spacecraft, wherein the distributed network management system comprises one or more component circuits, each configured to perform a respective function associated with the spacecraft, and a control circuit communicatively connected to each of the one or more component circuits, the method comprising:
establishing in-band (IB) communication paths and out-of-band (OB) communication paths to communicatively connect:
an attendant function and an accessor function, each executing on a control circuit implemented as hardware on the spacecraft;
the accessor function and each of one or more additional attendant functions executing on corresponding one or more component circuits implemented as hardware on the spacecraft; and
the accessor function and each of a collector function, a logic function, and a watchdog function executing on the control circuit; and
categorizing information to be communicated over the distributed network management system as being one of network management data and user data, wherein the network management data is used to perform network management tasks on the spacecraft, and wherein the user data is used for purposes other than the network management tasks on the spacecraft;
encapsulate the network management data in one of packets and escape sequences so as to distinguish the network management data from the user data;
communicating the network management data over the IB and the OB communication paths, wherein the network management data is a subset of the user data; and
communicating the user data only over the IB communication paths.

19. The method of claim 18 wherein the attendant function further configures the control circuit circuit to access components external to the distributed network management system.

20. The method of claim 18 wherein the attendant function further configures the control circuit to assess and derive status information from the accessor function, the collector function, the logic function, and the watchdog function via external telemetry signals communicated via the OB communication paths.

\* \* \* \* \*

UNITED STATES PATENT AND TRADEMARK OFFICE
CERTIFICATE OF CORRECTION

PATENT NO. : 10,581,692 B2
APPLICATION NO. : 14/886522
DATED : March 3, 2020
INVENTOR(S) : Brian C. Thompson and Andrew P. Riha Page 1 of 1

It is certified that error appears in the above-identified patent and that said Letters Patent is hereby corrected as shown below:

In the Claims

In Column 14, Line 65, in Claim 19, delete "the control circuit circuit" and insert -- the control circuit --, therefor.

Signed and Sealed this
Fourteenth Day of April, 2020

Andrei Iancu
*Director of the United States Patent and Trademark Office*